July 21, 1970 F. P. BALTAKIS 3,521,492
FAST RESPONSE PRESSURE GAGE
Filed Sept. 18, 1968
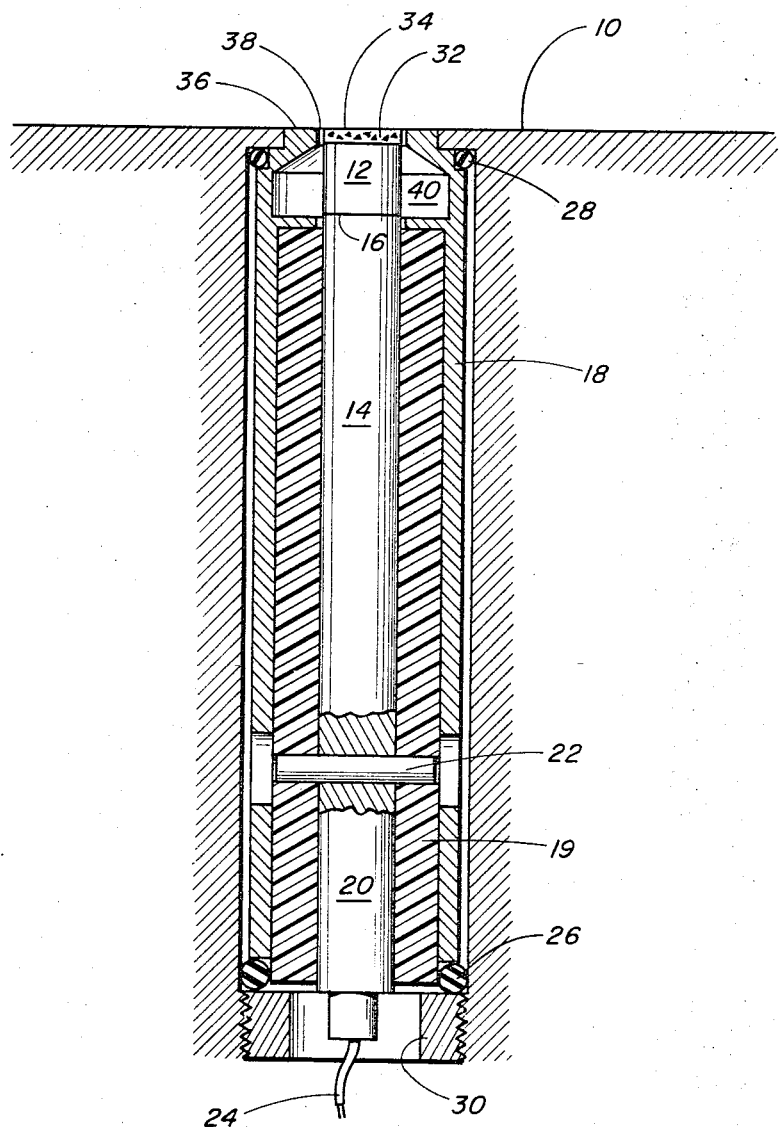
Frank P. Baltakis
INVENTOR
BY
ATTORNEY
AGENT

United States Patent Office

3,521,492
Patented July 21, 1970

3,521,492
FAST RESPONSE PRESSURE GAGE
Frank P. Baltakis, Bethesda, Md., assignor to The United States of America as represented by the Secretary of the Navy
Filed Sept. 18, 1968, Ser. No. 760,401
Int. Cl. G01i 9/06
U.S. Cl. 73—398   5 Claims

ABSTRACT OF THE DISCLOSURE

A fast response pressure gage having a pressure sensing element within a housing with a small gap between the sensing element and the housing for admitting restricted transient flow of a fluid pressure pulse into the housing, and a cavity within the housing between the sensing element and the internal portion of the housing to substantially reduce the pressure of the fluid pressure pulse.

BACKGROUND OF THE INVENTION

This invention relates generally to pressure transducers, and more particularly to a fast response pressure gage for sensing transient pressures.

Pressure responsive transducers are well known in the art. Generally, fast response pressure transducers have been of the piezoelectric or magnetostrictive variety and have found wide usage in underwater sonar detector applications and wind tunnel air pressure studies. Recently, in shock-wave analysis in ballistic ranges and wind tunnel applications, a need has arisen for a more rapidly responding pressure transducer than has been available in the past, which can reliably and accurately detect transient pressures of very short duration.

Prior art devices have relied upon a diaphragm or sealing arrangement to prevent pressurization of the sensing element about the periphery. However, such devices have necessitated an undesirable increase in the diameter of the gage, and the added mass and rigidity of the diaphragm adversely affect the response and output of the pressure sensing element.

SUMMARY OF THE INVENTION

Accordingly, one object of this invention is to provide a new and improved fast response pressure gage for sensing transient pressures.

Another object of the invention is the provision of a new and improved fast response pressure gage which eliminates pressurization of the sensing element at the periphery.

Still another object of the present invention is to provide a new and improved fast response pressure gage which is sensitive to small magnitude transient pressures.

Briefly, in accordance with one embodiment of this invention, these and other objects are attained by providing a fast response pressure gage having a cylindrical housing with an exposed apertured end surface containing a pressure sensing element having a cylindrical side surface and a relatively planar sensing surface where the side surface is within the housing and has a portion thereof extending through the aperture such that the planar sensing surface will normally be in alignment with the exposed end surface of the housing, a small gap between the cylindrical side surface of the sensing element and the housing at the exposed end surface, and an enlarged cavity within the housing extending for substantially the length of the cylindrical side surface of the sensing element and being in fluid flow communication with the exterior of the housing through the gap.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawing wherein the solitary figure is a side sectional view illustrated one embodiment of the fast response pressure gage of the present invention.

DESCRIPTION OF THE PREFERRED EMBODIMENT

Referring now to the drawing wherein the novel fast response pressure gage is illustrated as housed within a surface 10 which is subject to the effects of transient pressure pulses such as are experienced in a wind tunnel. The pressure gage consists basically of a piezoelectric crystal 12 bonded to one end of a metal rod 14 at an interface surface 16, and secured within a housing 18. The inner end 20 of rod 14 is anchored in an insulator sleeve 19 of Teflon or similar material by one or more metal pins 22. An electrical output lead 24 transmits a signal from the pressure gage which varies according to pressure changes in the crystal 12.

The preferred embodiment of the invention contemplates the use of a barium titanate crystal and a lead-tin alloy rod which have the same acoustic impedance. Pressure pulses originating in the crystal 12 from transient environmental pressures, therefore, pass from the crystal to the supporting rod 14 without acoustic reflections occurring at the interface 16 between the crystal and the rod. The crystal 12 is attached rigidly only at the interface 16 thereby remaining free to have a small differential oscillation with respect to the housing 18 without inducing stresses in the crystal. With the supporting rod 14 seated in a Teflon sleeve 19, which has been press fitted into the metal housing 18, good internal damping is provided.

When the pressure gage is fully assembled, housing 18 containing the sensing element may be moved into the sensing position shown in the figure with O rings 26 and 28 isolating the pressure gage from mechanical vibration of the surface 10. A retaining nut 30 is utilized to hold the housing in place. A thin layer of conducting cement 32 is applied to the top of the crystal 12 and contoured to the surface 10. The cement provides both shielding against radiation heating and contouring capabilities when the pressure gage is used for sensing transient pressures on a surface of a wind tunnel or ballistics range model.

The exposed surface 34 of crystal 12 extends through an aperture in the housing 18 so as to be normally in alignment with end surface 36. A small gap 38 is provided between the cylindrical side surface of the sensing element 12 and the housing 18 to admit a restricted flow of the transient fluid pressure pulse to the interior of the housing 18. An enlarged cavity 40 is defined within the housing 12 extending substantially the length of the cylindrical side surface of the crystal 12 so as to be in fluid flow communication with the exterior of the housing through the gap 38. Pressurization of the peripheral side surface of the sensing element 12 is prevented by making the gap 38 very small and by making the cavity 40 of a sufficient volume to substantially reduce the pressure of a transient pressure pulse of short duration.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A fast response pressure gage comprising:
   a cylindrical housing having an end surface with an aperture formed therein,
   a pressure sensing element within said housing having a cylindrical side surface and a relatively planar sensing surface, said side surface being within said housing and having a portion thereof extending into said aperture such that said planar sensing surface will normally be in alignment with said end surface, said cylindrical side surface of said sensing element and said housing at said end surface defining a narrow annular gap therebtween and said housing defining an enlarged cavity extending substantially the length of said cylindrical side surface of said sensing element and being in fluid flow communication with the exterior of said housing through said gap.

2. The fast response pressure gage as defined in claim 1 wherein said sensing element is a pressure responsive barium titanate crystal for sensing transient pressures and converting said pressures to electrical signals, and further comprising
   a lead-tin alloy rod having one end bonded to one surface of said crystal element and forming an acoustical impedance match with said element, and
   means for securing said rod and crystal to said housing including a Teflon sleeve press fitted between said rod and the inside wall of said housing whereby said crystal is free to oscillate in said housing but is damped by said rod.

3. A fast response pressure gage comprising
   a housing having an aperture defined therein,
   a sensing element within said housing and having a portion thereof extending into said aperture,
   means for admitting restricted flow of a fluid pressure pulse through at least a portion of said aperture into said housing, and
   means within said housing for reducing the pressure of said fluid pressure pulse.

4. The gage of claim 3 wherein said aperture is of a size slightly larger than said sensing element and substantially smaller than the internal cross-section of said housing.

5. The gage of claim 3 wherein said sensing element is a cylindrical piezoelectric crystal and said means for reducing the pressure of said pressure pulse includes an enlarged cavity within said housing and surrounding substantially the entire length of the cylindrical crystal side walls,
   whereby, for pressure pulses of short duration, the fluid pressure on the sidewall of the crystal will be substantially less than the pressure on the end of the crystal within said aperture.

References Cited

UNITED STATES PATENTS 3,337,844   8/1967   Baltakis _____ 73—398 XR

OTHER REFERENCES

Knight: "Piezoelectric Detector for Low-Pressure Shock Waves." The Review of Scientific Instruments, vol. 29, No. 2, February 1958, pages 174 and 175.

DONALD O. WOODIEL, Primary Examiner

U.S. Cl. X.R.

73—147; 338—4; 340—10